(No Model.)
B. Z. DAMPIERRE.
DOUGH RAISING TRAY.
No. 411,279. Patented Sept. 17, 1889.
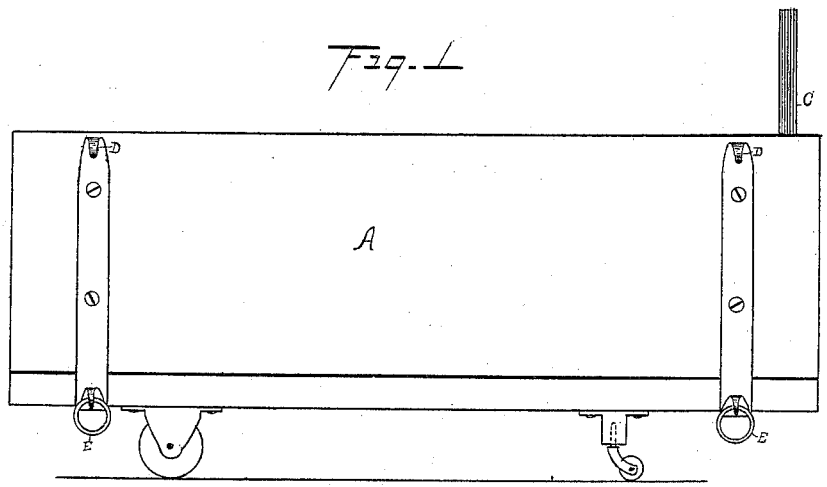
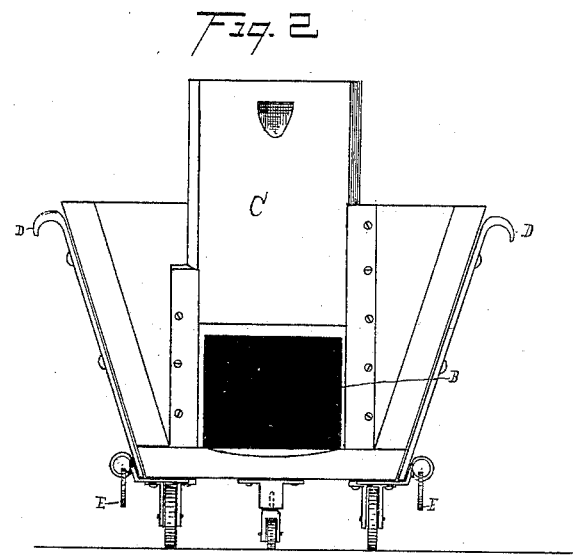
WITNESSES
Bazile J. Dampierre INVENTOR
Leggett & Leggett Attorney

UNITED STATES PATENT OFFICE.

BAZILE Z. DAMPIERRE, OF CLEVELAND, OHIO.

DOUGH-RAISING TRAY.

SPECIFICATION forming part of Letters Patent No. 411,279, dated September 17, 1889.

Application filed November 7, 1887. Serial No. 254,528. (No model.)

*To all whom it may concern:*

Be it known that I, BAZILE Z. DAMPIERRE, of Cleveland, in the county of Cuyahoga and State of Ohio, have invented certain new and useful Improvements in Dough-Raising Trays; and I do hereby declare the following to be a full, clear, and exact description of the invention, such as will enable others skilled in the art to which it pertains to make and use the same.

My invention relates to improvements in dough-raising trays; and it consists in certain features of construction and in combination of parts hereinafter described, and pointed out in the claim.

In the accompanying drawings, Figure 1 is a side elevation. Fig. 2 is an end elevation.

A represents what is usually known as a "dough-raising tray," the same consisting, usually, of a wooden structure of any desired size and approximately of the form shown. Such trays, when of large size, are mounted on wheels. The practice in bakeries has been when the dough was raised to remove such trays by the side of a kneading-machine and remove the dough or sponge from the tray in handfuls and place it in the kneading-machine. Such method involved much manual labor of a disagreeable kind, the workman being usually besmeared from head to foot with the dough.

My improvement consists in providing a large opening in the tray, such opening being closed with a door or slide. This opening is arranged, as shown at B, at one end of the tray, with a slide or gate C. If preferred, however, such opening may be made at the side or bottom of the tray. Hooks D and, preferably, rings E are provided for attaching chains or cables for elevating the tray.

With such construction the tray laden with raised dough or sponge can be moved by the side of the kneading-machine, and by means of tackle, windlass, or other hoisting mechanism the tray is elevated and inclined, so that the dough or sponge will discharge by gravity into the kneading-machine. By such an arrangement of parts a great saving of labor and time is effected. In the first place it obviates the necessity of handling the dough by hand, and again, the dough is discharged much more rapidly and regularly than could be done by hand. Again, when the tray is elevated, the dough passes in a continuous mass from the tray, which is in effect a hopper, to the kneading-machine, and hence the process of kneading is carried on continuously from the time the gate is opened until the contents of the tray are discharged. As fast as the contents of a tray are discharged it is lowered and another tray elevated to proper position and its contents discharged. With such construction a great deal of time and labor are saved over the methods heretofore employed.

What I claim is—

A dough-raising tray mounted on wheels, having a doorway or opening of large size, suitable for discharging the sponge from the tray, a slide or gate for closing such opening, suitable apparatus, preferably hooks and rings, as shown, for attaching hoisting mechanism, the parts being arranged substantially as set forth.

In testimony whereof I sign this specification, in the presence of two witnesses, this 18th day of October, 1887.

BAZILE Z. DAMPIERRE.

Witnesses:
CHAS. H. DORER,
ALBERT E. LYNCH.